July 28, 1953    R. T. SAVAGE ET AL    2,647,044
SOLIDS BAFFLE FOR CATALYST APPARATUS
Filed March 26, 1949    2 Sheets-Sheet 1
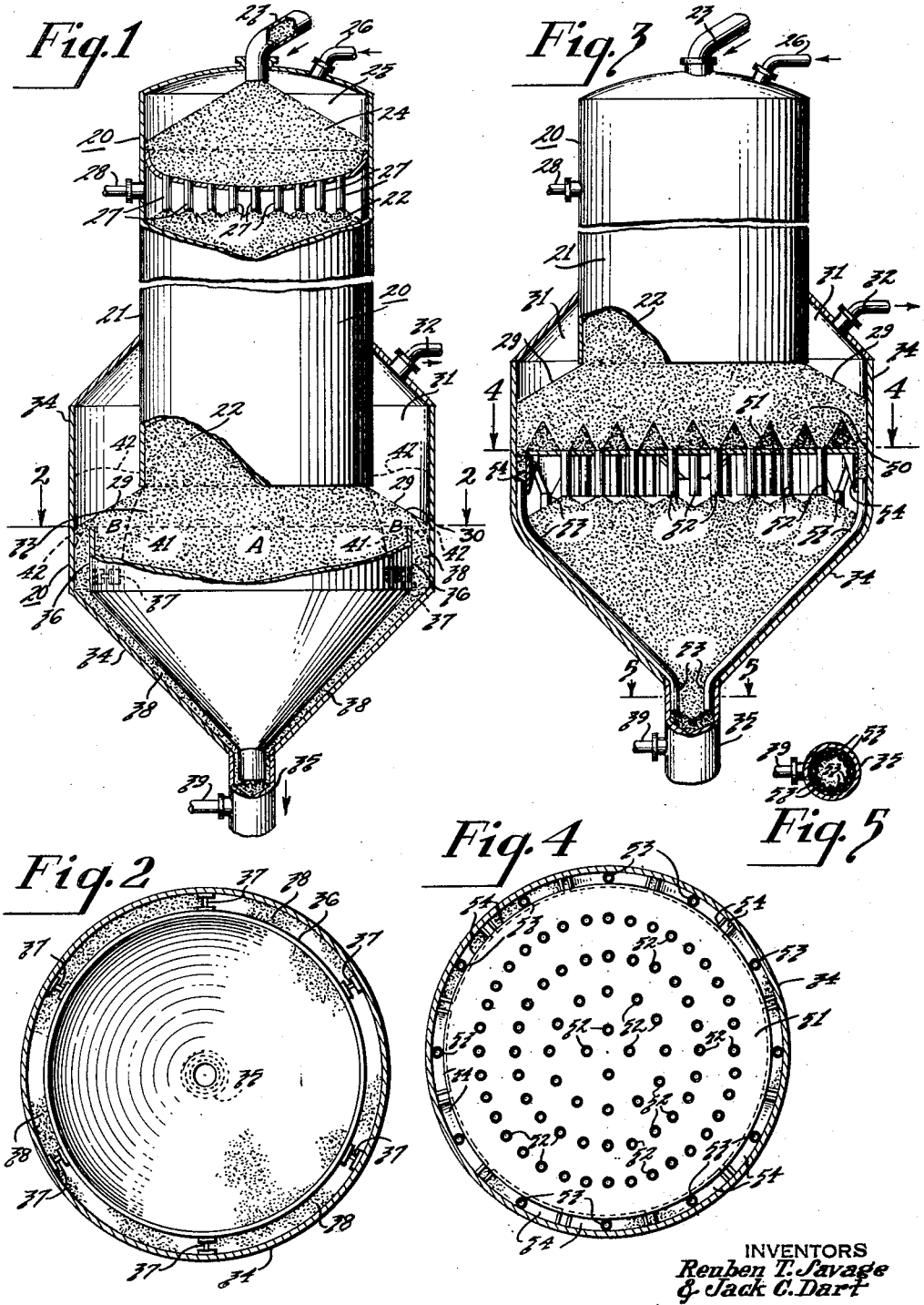
INVENTORS
Reuben T. Savage
& Jack C. Dart
BY
AGENT

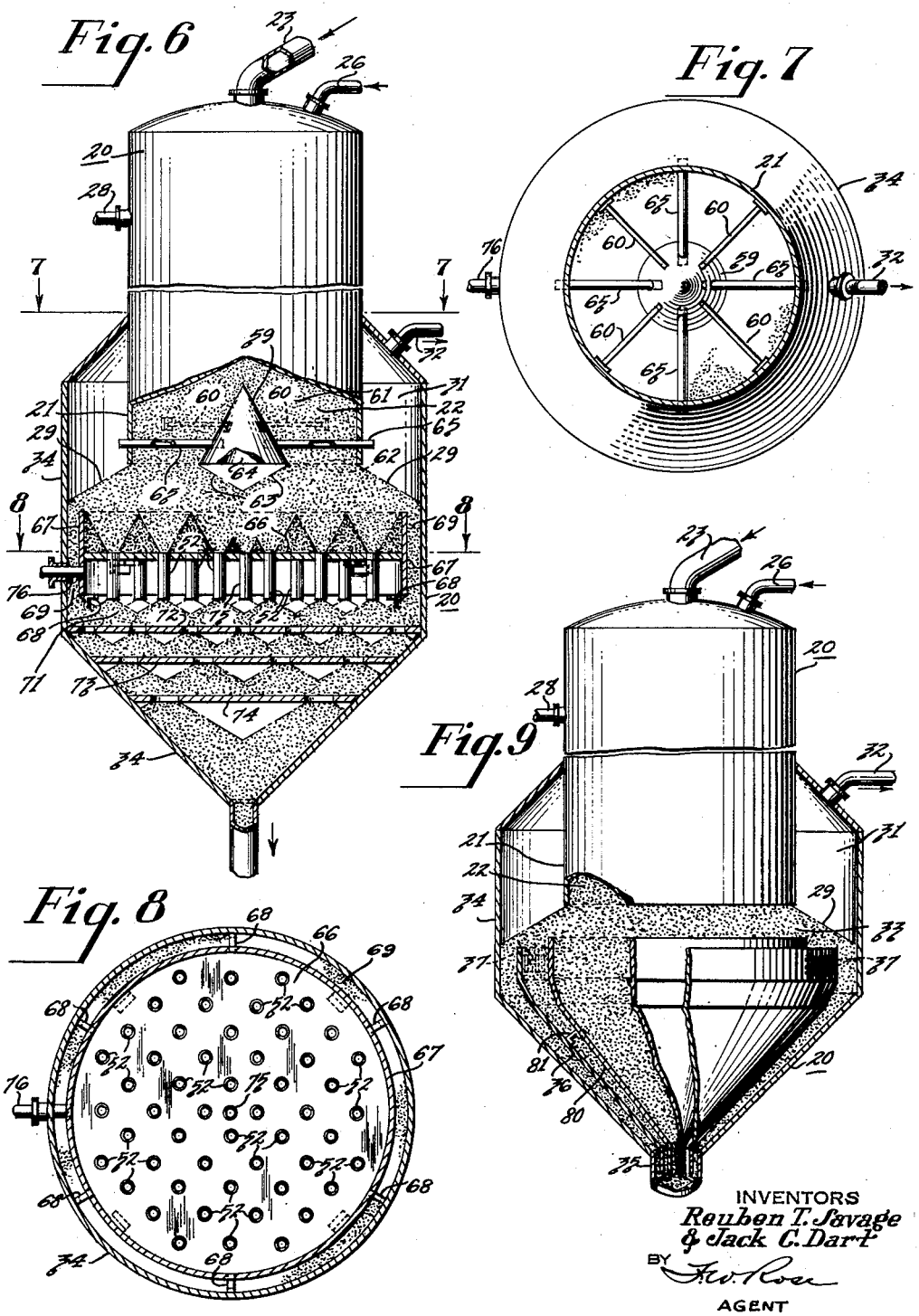

Patented July 28, 1953

2,647,044

UNITED STATES PATENT OFFICE 2,647,044

SOLIDS BAFFLE FOR CATALYST APPARATUS

Reuben T. Savage, Ridley Park, and Jack C. Dart, Moylan, Pa., assignors to Houdry Process Corporation, Philadelphia, Pa., a corporation of Delaware Application March 26, 1949, Serial No. 83,669

1 Claim. (Cl. 23—288)

The use of moving bodies of fluent solid particles in processes that involve the contact of masses of such solid particles with fluids, as, for example, catalytic conversions of organic vapors by solid catalysts, has resulted in considerable advantages due to the continuous nature of the process but has also created problems arising from the inherent characteristics of such processes and of solid particles in such a fluent state. One such problem involving the disengagement of gas flowing concurrently through a downwardly moving bed of fluent solid particles in a contact zone may be overcome using methods and apparatus embodying the present invention.

The general technique for use of downwardly moving non-turbulent bed of fluent solid particles as contact masses is set forth in the technical literature (see, for its application to the catalytic cracking of hydrocarbons, an article entitled "The 'T. C. C.' cracking process for motor gasoline production," by R. H. Newton, G. S. Dunham, and T. P. Simpson, "Transactions of the American Institute of Chemical Engineers," volume 41, page 215, April 25, 1945, and the articles there cited, and for its application to the use of fluent inert particles for pyrolytic conversions, an article entitled "Thermofor pyrolytic cracking," by S. C. Eastwood and A. E. Potas, "Petroleum Processing," volume 3, page 837, September 1948).

Recent investigations have shown that it is often desirable in such processes to flow the gas downwardly through the moving contact mass at high gaseous velocities. In many cases, these gaseous velocities attain a magnitude such that, if the gaseous flow were upward, the downward flow of solid particles would be disturbed to such an extent as to result in stoppage of the flow of solid particles and/or disruption of the bed with resulting turbulence, channelling of the gas and similar effects. These effects have been capably discussed in a recent patent (U. S. Patent No. 2,439,348, issued April 6, 1948, to T. P. Simpson, R. E. Lee and F. E. Ray). The cited patent points out the advantages of disengagement under conditions such that the disengaging surfaces provide a substantially greater area than the horizontal cross sectional area of the bed of solid particles in the contact zone. The present invention involves improvements in the disengagement of gases from beds of fluent solid particles and may be applied to systems such as those described in the cited patent. Like the cited patent, the present invention is useful in connection with a wide variety of processes, but will, for convenience and brevity, be described in terms of hydrocarbon conversion processes, particularly cracking; those skilled in the art will be able to adapt the process and apparatus set forth herein to other fields and uses.

The problem of high gaseous velocities becomes particularly important when hydrocarbon cracking systems are operated advantageously at high catalyst to oil ratios, such as four or more. It then becomes desirable and highly advantageous to employ concomitantly higher space velocities than have previously been customary in commercial moving bed systems for equal conversions. (The space velocity is the volume rate of admission of hydrocarbons to the cracking zone, on a condensed basis (i. e., the volume of the hydrocarbons in a liquid state at 60° F. charged per hour) divided by the volume of catalyst instantaneously present in the cracking zone; the catalyst to oil ratio as used herein is the ratio of the weight rate of admission to the cracking zone of catalyst to that of the hydrocarbons.) It clearly follows from the above definition that the higher the space velocity, the smaller the volume of catalyst present in the converison zone. When space velocities above one, such as from about two to four or more, are used, this effect must be considered in the design of reactor vessels.

If this small amount of catalyst is disposed in a deep bed of very small horizontal area, the pressure drop through such a bed is impractically high. If a relatively short, shallow bed of relatively large cross sectional area is employed, inequalities in the upper surface of the bed (or the profile) caused by feeding the solid particles as one or more columns of catalyst to the upper surface of the bed (see Figure 1) result in inequalities of considerable magnitude in space velocities through various sections of the bed with resulting inefficiencies and mechanical disturbances in operation. Indeed, care must be taken lest the amount of catalyst is only sufficient to fill the disengaging section. Moreover, shallow beds require that considerable precision in fixing the bed depth be exercised in order to obtain a desired space velocity and hence a desired conversion.

The above considerations render broad beds of intermediate horizontal cross sectional area desirable. This shape of bed results in sufficiently high gas velocities through the bed as to cause the attendant difficulties that are discussed in the cited patent. It is to be noted that the disengagement of gas from the fluent particles involves the formation of free surfaces of the particles and a reversal of flow of the gas so as to pass upwardly through the free surfaces so formed, so that at high gaseous velocities ordinary methods of disengagement result in entraining excessive amounts of the particles in the disengaged gas. It therefore often becomes necessary, in order to avoid entrainment of the solid particles in the disengaged gases, to employ a total disengaging surface substantially greater than the horizontal cross sectional area of the bed in the conversion zone.

As shown in the cited patent, disengaging surfaces may be developed by a plurality of sets of multiple inverted troughs or sets of catalyst discharge conduits (a set of such conduits discharge catalyst to a bed below so as to form an upper free surface to the bed and thus form what is known as a plenum chamber), these sets being placed at a plurality of vertical levels. If multilevel disengagement is used, the total hydrocarbon vapors transverse only a fraction of the bed before some vapors are disengaged; more and more vapors are disengaged as the remainder of the vapors progress downwardly through the bed. In contrast to such conditions, it is obviously desirable from the standpoint of uniformity of conversion conditions to have as much of the vapors as possible contact all of the bed. Moreover, if a plurality of levels of catalyst discharge conduits are used, the amount of pressure drop therethrough may be sufficiently high as to create problems in other sections of the refinery.

Multilevel disengagement can be avoided if the catalyst in the bed in the reaction zone flows therethrough in compact non-turbulent form (i. e., in a bed) and discharges from the reaction zone as a compact stream and thereafter expands outwardly to form a disengaging surface which is the frusto-conical upper free surface of a lower bed of increased diameter (as, for example in U. S. Patent No. 2,400,194, issued on May 14, 1946, to R. B. Day et al., and Figure 1 herein). However, in order that the disengaging surface thus formed have an area that is equal to the horizontal cross sectional area of the bed in the reaction zone, the diameter of the lower bed must be about 40 percent greater than that of the bed in the reaction zone. (The area of a disengaging surface is referred to herein as measured by projection on a horizontal plane.) When the downward gaseous velocities in the reaction zone exceed values that, in reverse flow, would cause lifting of the particles, the amount of necessary disengaging surface is increased with a corresponding increase in the diameter of the lower bed. In vessels of commercial size, the diameter of the largest part of the vessel is of considerable importance since vessels of large diameter are difficult to fabricate or ship; indeed, vessels of relatively large diameter often must be field assembled with a consequent increase in cost. It is therefore clear that the present invention, by which the efficiency of a disengaging surface may be increased without increasing its area, provides a considerable advantage over previous methods and apparatus.

The present invention and the manner in which it increases the efficiency of a disengaging surface is more clearly understood by considering the phenomena occurring at such a surface, particularly under conditions of continuous operation. The function of a disengaging surface is to permit the escape of gases associated with the fluent solid particles under conditions such that entrainment of the solid particles does not occur, as discussed above and in the first cited patent. Clearly the velocity of the escaping gas must be below the velocity at which lifting or elevation of the particles occur. For this reason, the area of the disengaging surface must be correlated with the total amount of gas to be passed through such a surface. For example, a loading of hydrocarbon vapors that would cause a pressure drop of between about 4.0 to about 6.0 inches of water in passing through a bed one foot thick is a convenient design figure when the area of the disengaging surface is relatively small.

When the disengaging surface is a large continuous surface of the type herein involved, it has been discovered that the above concept must be modified because entrainment can occur even though the surface, as a whole, has sufficient capacity. Such entrainment occurs because the greatest disengaging load (and highest gaseous pressure) exists in the uppermost portion of the disengaging surface (i. e., the portion of the disengaging surface adjacent to the periphery of the lowermost boundary of the reaction zone). So pronounced is this effect that a condition can be reached where further increase in the area of the disengaging surface by increasing the height (and diameter) of the frusto-conical surface of the lower bed of solid particles does not increase its disengaging capacity.

The above considerations apply to the conditions of the disengaging surface at the start of its use. It has now been found that the condition of the disengaging surface may change so radically as the operation continues that the disengaging capacity of such a surface is considerably reduced. This is due to the existence, under such conditions, of regions of hindered and unhindered flow of solid particles in the bed whose frusto-conical free upper surface forms the disengaging surface.

It has been found, as explained more fully below, that a region of unhindered flow exists in such a bed, such a region being generally coextensive at its top with the stream of particles discharging from the zone above and expanding somewhat below its top. In contrast to this region, there also exists in such a bed a region of hindered flow, the latter region being bounded by the disengaging surface and the periphery of the region of unhindered flow (and, of course, the peripheral limits of the bed). As the operation continues, solid particles accumulate in the region of hindered flow faster than they are removed, with the result that a static or relatively static body of particles builds up above the initial disengaging surface. As times goes on, this static body of particles grows, the disengaging capacity is reduced and serious entrainment results. Under some conditions, the static body of particles fills the gas collection space or chamber above the disengaging surface and the apparatus becomes inoperable.

In accordance with the broad aspect of the present invention, the difficulties discussed above are overcome by accelerating the flow of fluent solid particles through a region of hindered flow of such particles in a bed having a disengaging surface of the type herein described using the methods and apparatus described below so as to prevent the accumulation of a body of static particles above such a disengaging surface.

The principles involved in the present invention are set forth in detail below in connection with the description of the drawings in which various embodiments of the present invention are shown. It is to be understood that these embodiments are to be regarded as illustrating the present invention rather than restricting its scope.

In the drawings:

Figure 1 is a vertical view of a vessel containing a moving bed of solid particles contacted by gas, with portions of the vessel broken away for a better view of the relationship of the parts, and illustrates one embodiment of the present invention;

Figure 2 is a transverse section of the vessel illustrated in Figure 1, the section being taken along the lines 2—2 and shows the relationship of the parts of the apparatus at this level of the vessel;

Figures 3, 6 and 9 are vertical views of vessels similar to the vessel shown in Figure 1 and illustrate other embodiments of the invention;

Figures 4 and 5 are transverse sections of the vessel illustrated in Figure 3, these sections being taken along the lines 4—4 and 5—5 and showing the relationship of the parts of the apparatus at these levels of the vessel;

Figures 7 and 8 are transverse sections of the vessel illustrated in Figure 6, these sections being taken along the lines 7—7 and 8—8 and showing the relationship of the parts of the apparatus at these levels of the vessel.

Shown in Figures 1, 3, 6 and 9 is a closed housing or vessel indicated generally at 20, which housing contains an upper chamber 21 defining a contact, reaction or cracking zone generally coextensive with a bed of solid particles 22. Fluent solid particles in the size range of from about 50 mesh to about 0.5 inch, such as between about 1/16 to 1/8 inch in diameter, and comprising solid hydrocarbon conversion catalyst, such as acid activated montmorillonite clay, synthetic silica-alumina gel in pellet or bead form or other solid refractory compositions known by those skilled in the art to be hydrocarbon cracking or conversion catalysts, are introduced to housing 20 by means of conduit 23 and form, as shown in Figure 1, a bed 24 in sealing or catalyst introduction chamber 25 as shown. As is known to the art, a sealing gas may be introduced to chamber 25 by conduit 26.

Particles in bed 24 flow from chamber 25 through conduits 27 (which are arranged to give even distribution of the particles over the horizontal cross sectional area of bed 22) and thereafter move downward through bed 22 in compact non-turbulent downward flow. Hydrocarbons in vapor form may be introduced by a conduit 28 and thereafter flow downwardly through bed 22 concurrently with the downwardly moving particles of catalyst. If desired, arrangements can be made at the top of bed 22 for introducing liquid hydrocarbons and contacting them with particles of catalyst by known methods and apparatus.

The fluent solid particles of catalyst are discharged from the bottom of chamber 21 as a compact stream of particles and form a disengaging surface 29 by expansion of the stream of particles outwardly while the particles move generally downwardly. As can be seen in the drawings, the stream thus discharged has a shape and cross sectional area defined by and identical with the planar free opening of the bottom of the upper chamber or contact zone. Hydrocarbon vapors passing downwardly through the bed discharge from the conversion zone (which is considered as extending from the intersection of disengaging surface 29 with the bed of particles 22 to the top of bed 22) and pass through the stream of solid particles emerging from chamber 21. Thereafter, the hydrocarbon vapors reverse the direction of their flow and pass through disengaging surface 29, at which surface the vapors are disengaged from the particles of catalyst. After disengagement, the vapors flow upwardly into a peripheral gas collection space or chamber 31, from which they are removed through conduit 32. Although only one conduit 32 is shown, a plurality of such conduits preferably spaced around the periphery of the housing and manifold may be used. The hydrocarbon vapors, after removal from housing 20, may be directed to other apparatus for appropriate further processing.

The particles discharging from bed 22 form a bed 33, which bed is confined and defined by a disengagement chamber or zone indicated generally at 34. Chamber 34 is shaped and positioned so that bed 33 is of larger horizontal cross sectional area than chamber 21 and hence larger than bed 22. Chamber 34 surrounds and communicates with the bottom of chamber 21 and extends from a level above the bottom of chamber 21 to a level below the bottom of chamber 21. Chambers 21 and 34 are spaced and positioned so that the upper peripheral portion of chamber 34 is free of catalyst and hence provides an annular gas collection space or chamber 31 between chambers 21 and 34. The bottom of chamber 34 tapers inwardly toward its vertical axis and communicates at its lower end with conduit 35 which has a relatively small cross sectional area compared to the upper portion of chamber 34, as can be seen from Figure 1.

In accordance with the present invention, a funnel shaped member 36 is positioned in and spaced a relatively small distance apart from the bottom of chamber 34 by spacers 37. Funnel shaped member 36 is open at both ends and extends from a level below the bottom of chamber 21 and below disengaging surface 29 to a level below the juncture or intersection of the bottom of chamber 34 and conduit 35. Funnel shaped member 36 comprises, at the top thereof, a cylindrical baffle spaced from the wall of chamber 34 as shown in Figure 1.

When particles of catalyst are flowing through bed 33, a major portion of the particles will flow down through the bed inside funnel shaped member 36, while some of the catalyst particles, particularly those in the outermost peripheral portion of disengaging surface 29, will flow downwardly through annular passageway 38, which passageway lies between the interior of chamber 34 and the exterior of funnel shaped member 36. The two streams of catalyst flow inside and outside of funnel shaped member 36, respectively, commingle and merge below the bottom of funnel shaped member 36 and thereafter flow together through conduit 35 to other ports of the system, as for example, to a regenerator or kiln in which coke deposited on the catalyst as a result of the conversion of the hydrocarbons is removed by combustion. The technical details of, and apparatus for, effecting the cyclic operations of this type are found in the art (see, for example, the first article cited above). Steam for stripping the catalyst of volatile hydrocarbons may be introduced by conduit 39, pass upwardly through the two streams of catalyst particles referred to above to gas collection chamber 31 and commingle with the hydrocarbon vapors.

As stated above, there is a region of hindered flow in bed 33 as well as a region of relatively unhindered flow. The particles discharged from bed 22 as a stream move generally downwardly, the major portion thereof flowing through the region of unhindered flow indicated generally at A and bounded by dotted lines 41 in Figure 1. As indicated in Figure 1, the region of unhindered flow is coextensive at its upper end with the bottom of bed 22. The part of the bed in the disengagement zone which lies outside the region of unhindered flow is a region of hindered flow (the region of hindered flow thereby being bounded by the periphery of the region of unhindered flow, as represented by dotted lines 41, by disengaging surface 29 and by the walls of chamber 34, which define the outer limits of the bed). In a bed which does not contain a means of accelerating the flow in the region of hindered flow (which region is indicated generally by B in Figure 1) such as funnel shaped member 36, the particles move much more slowly in region B than in the region of unhindered flow A. Indeed, in such a bed there is a small region lying above dotted lines 42, in which region the particles are static or relatively static. It is believed that the reason for hindered flow as above described depends on one or more of the factors discussed below. It is to be noted that the various regions referred to herein are probably not separated by sharp boundaries, such as the lines used for convenience in Figure 1, but rather are separated by transitional regions in which the type of flow changes gradually. However, such transitional regions are relatively minor and the behavior of the solid particles may be accounted for by using the concept of various regions characterized by different types of flow.

Fluent solid particles as herein considered have a considerable tendency to move in straight lines when flowing non-turbulently downwardly, and changes in the size of the areas through which such particles flow are not as immediately reflected in the flow characteristics of the individual particles as would be the case if the material flowing were a liquid or gas. Consequently, although the particles discharged from chamber 21 form a surface inclined at the angle of repose when discharged from the chamber (indicated by surface 29), the outermost portion of the disengaging surface, as well as most of the region lying immediately thereunder, is a region of relatively little if any movement of the solid particles. Similar effects have been noted when fluent solid particles are discharged from a bed through a relatively small orifice (see for example, the article by Newton et al. cited above), but the consequences of discharge from a zone such as chamber 21 into a larger zone such as chamber 34 have not been observed or appreciated.

As indicated immediately above, the movement of particles in region B is relatively slow, which means that the downward force of gravity exerted on the particles is to a considerable extent balanced by forces resulting from the supporting action of other particles closer to the center of the bed; therefore the net force exerted on the individual particle downwardly is quite small (i. e., the force of gravity is almost balanced). Consequently, the upward force of gas being disengaged at surface 29 is sufficient to hinder or delay completely the downward flow of particles in region B. As the operation continues, particles accumulate generally in the lowermost and outermost portions of the disengaging surface (i. e., above region B) as a static or relatively static body of particles. As time goes on, this body of particles becomes greater until finally a considerable body has built up in gas collection space 31. In visual observations of models of vessels such as that shown in Figure 1, the disengaging surface of models which did not have a funnel shaped member were observed to build up to levels as high as that indicated by dotted lines 42 in Figure 1, at which point the operation of the model was terminated since it was apparent that further operation would completely fill disengaging chamber 31.

It has been found, and confirmed by visual observation of models, that when, in accordance with the present invention, a funnel shaped member such as that illustrated in Figure 1 is positioned in the bottom of the bed in the disengaging chamber, the flow of particles through region B is accelerated and an accumulation of particles is either minimized or completely prevented. (The term accelerate, as used herein, refers to the velocity existing in the region of hindered flow in vessels not employing the present invention. Generally, in accordance with the present invention, the apparatus is designed so that the velocity in region B is about the same as that in region A although it may be somewhat greater as explained below.) Visual observation of such models showed that particles in the periphery of the disengaging surface moved relatively rapidly and continuously. Moreover, even when vapors were disengaged at disengaging surface 29 at a rate such that there is some accumulation of particles above the plane formed by the angle of repose of the particles (the initial condition of disengaging surface 29), the apparatus was still operable and attained an equilibrium condition such that particles flow evenly and continuously through the bed of particles so built up. So pronounced is the effect of accelerating the flow in the hindered region that a 75 percent increase in the equilibrium disengaging capacity was observed when funnel shaped member 36 was inserted in a vessel such as that in Figure 1.

As indicated in Figures 2 and 6, various embodiments of the invention may be employed to achieve the desired effect. Thus, in the embodiment illustrated in Figures 3, 4 and 5 (parts or elements in these figures are numbered the same as those in Figures 1 and 2 and perform the same function as the correspondingly numbered parts or elements in Figures 1 and 2), bed 50 rests upon a horizontal tube sheet 51 from which depend a plurality of open ended vertical particles discharge conduits 52. Tube sheet 51 is positioned in chamber 34 at a level below the bottom of chamber 21 and extends over substantially all of the horizontal cross sectional area of chamber 34. Conduits 52 are arranged regularly over the horizontal cross sectional area of chamber 34 and are evenly spaced around a plurality of concentric circular loci as shown in Figure 4. Particles in the periphery of the disengaging surface 29 are disengaged therefrom through conduits 53 which conduits communicate at their open upper ends with funnels 54. Conduits 53 and funnels 54 thereby provide means for discharging particles from the periphery of the space above tube sheet 51 and below the bottom of chamber 21. As shown in the drawings, the upper ends of funnel 54 are at the same horizontal level as horizontal tube sheet 51. The bottom of conduits 53 terminates within conduit 35.

As indicated by the darker portions of bed 50 in Figure 3, static bodies of particles rest on tube sheet 51, the lighter portion of the bed area being regions of relatively unhindered flow into conduits 51 and 53. It is to be noted that the region of unhindered flow above funnels 54 is vertically below the outermost portion of disengaging surface 29, thereby accelerating the flow of particles in this region.

In the embodiment illustrated in Figures 6, 7 and 8 conical member 59 which is positioned within and above the bottom of chamber 21 by supports 60 causes the particles in bed 61 to discharge from the conversion zone as an annular stream through annulus 62 formed by the bottom of chamber 21 and the bottom of conical member 59. The solid particles diverge outwardly and converge inwardly after emergence from annulus 62 with the resultant formation of a central disengaging surface 63 as well as peripheral disengaging surface 29. The space beneath conical member 59 forms a central gas collection space or chamber 64 which is in communication with the peripheral gas collection chamber 31 through conduits 65.

Positioned in the lower part of chamber 34 is a tube sheet 66 from which depend a number of short open ended vertical particle discharge conduits 52 through which the major portion of the particles flow. Horizontal tube sheet 66 is, as shown, of lesser extent than the horizontal cross sectional area of the interior of chamber 34. Contiguous to the periphery of tube sheet 66 is a vertical baffle 67 which may be affixed to tube sheet 66 by welding if desired. Baffle 67 is spaced away from interior of chamber 34 by spacers 68 as to form a peripheral annulus 69. Vertical baffle 67 is cylindrical in shape and extends from a level above tube sheet 66 but below the bottom of chamber 21 to the level of the bottom of particle discharge conduits 52 so that particles discharge from peripheral annulus 69 at the same level as the majority of particles. Particles discharged both by peripheral annulus 69 and particle discharge conduits 52 to form a bed 71, as indicated in Figure 6, from which bed particles are discharged by solid particle removal means known to the art such as a series of spaced orifice plates 72, 73 and 74 (such a device is described more fully in U. S. Patent 2,412,136, issued on December 3, 1946, to L. P. Evans et al.).

One particle discharge conduit 75 is located at the center of tube sheet 66 and is therefore vertically below the center of the central disengaging surface 63. Conduit 75 performs the same function for disengaging surface 63 as does the peripheral annular passageway 69 for disengaging surface 29 by accelerating the flow of particles in a region of hindered flow. The center of disengaging surface 63 is the outermost portion of this surface in the sense that it is the portion of the surface which is furthest removed from the stream of particles flowing in annulus 62 and is susceptible to conditions which build up a static body of particles. Conduit 75 is positioned so that the central portion of surface 63 is in a region of unhindered flow to conduit 75.

The space between conduits 52 and between the upper surface of bed 71 and the bottom of tube sheet 66 forms a chamber into which steam, spent flue gases and the like may be introduced by conduit 76 for purging the particles of volatile hydrocarbons. Purge gas so introduced enters the surface of bed 71, passes upwardly through conduits 52 and peripheral annulus 69 and is disengaged from the particles of catalyst at disengaging surfaces 29 and 63 and is thereafter removed from the housing together with the hydrocarbon vapors in gas collection space 31.

Figure 9 illustrates still another embodiment of the invention, which is somewhat similar to the embodiment shown in Figures 1 and 2, and in which a second funnel shaped member 80 is positioned within the first funnel shaped member 36 and spaced a relatively small distance therefrom by spacers 81. The top of the second funnel shaped member 80 is spaced at a level a relatively small distance above the top of funnel shaped member 36 but below the bottom of upper chamber 21. The second funnel shaped member 80 extends downwardly to the same level as the first funnel shaped member 36. The second funnel shaped member 80 serves to insure proper flow in the intermediate portion of surface 29.

In the embodiments typified by Figures 1, 3, 6 and 9, the particles in the outermost portions of the disengaging surfaces are discharged from bed 33 as a stream or streams separate from the stream or streams comprising the major portion of the particles flowing through from the bed (i. e., the major portion is that portion flowing on the inside of funnel 36 in Figure 1 or through particle discharge conduits 52 in Figures 3 and 6 or the inside of funnel 80 in Figure 9). As described above, these separate streams are subsequently merged and commingled at a level therebelow. By regulating or predetermining the relationship of the areas of discharge at the level at which these streams merge, the relative rates of flow of the two streams can be regulated or predetermined. In general, the relationship of the areas of discharge is approximately the same as the relationship between the areas in the bed in the disengagement zone (i. e., beds 33 or 53) served by these streams. Thus, typically the area of the top of annulus 38 bears the same relationship to the cross sectional area of the top of funnel 36 as does the area of the bottom of annulus 38 to the area of the discharge end of funnel 36. However, in the event that a proportionately faster flow of particles in the disengaging surface is desirable, the area of discharge of the stream of these particles may be correspondingly increased.

It is one feature of the present invention that the means for discharging particles from the outermost portion of the disengaging surface are positioned and located so that said outermost portion is in a region of unhindered flow to said means. Thus, in Figure 1 or 6, the upper rim of funnel shaped member 36 or vertical baffle 67 is located close to the surface of disengaging surface 29. The location of surface 29 may be assumed, for design purposes, to be the same as the angle of repose of the particles, which angle will be, for the particles herein referred to, between about 25° to 40° to the horizontal. In commercial size vessels of between about 2 feet to 15 feet in diameter, said upper rim may be positioned within about 6 inches to about 2 feet of surfaces 29 when the surface is at the angle of repose.

In the embodiment shown in Figure 3, the upper end of the means for removing particles from the peripheral portion of the disengaging surface 29 (and from the control portion of surface 63 in Figure 6) is spaced below the surface a greater distance than in Figures 1, 3 and 9 but, as indicated in the drawings, the portion of the disengaging surface, in which the flow of particles is to be accelerated, is within a region of unhindered flow extending above the means for removing particles as stated. By directly flowing into such means and thereafter being discharged as a separate stream, the particles flow under the desired conditions in regions where the flow would otherwise be hindered.

It is apparent from the above description, that the present invention provides a method for improving the disengagement of gas from fluent solid particles at a free upper surface of a body of said particles employed as a disengaging surface, during which disengagement the gas flows upwardly through the disengaging surface so as to retard the downward flow of said particles. Thus, when fluent solid particles are discharged from an upper zone into a lower zone of larger horizontal cross sectional area and the particles so discharged are moved outwardly in the lower zone so as to form a disengaging surface having a more centrally located portion and a less centrally located portion, gas being disengaged at said surface as described herein, the flow of solid particles in the less centrally located region of the disengaging surface is accelerated and retardation of the downward flow of solid particles by the upward flow of gas is minimized in accordance with the present invention. This effect is obtained by discharging downwardly from the more centrally located portion of the disengaging surface, as at least one stream in the central region of said lower zone, a part of the particles moved outwardly and by discharging downwardly from the less centrally located region of said disengaging surface, as at least one stream separate and apart from said first mentioned stream, the remainder of the particles moved outwardly.

Obviously many modifications and variations of the invention as hereinbefore set forth may be made without departing from the spirit and scope thereof and therefore only such limitations should be imposed as are indicated in the appended claim.

We claim as our invention:

Apparatus for contacting gas with a gravitating compact mass of particle-form solids and thereafter disengaging said gas from said solids comprising: an upright elongated vessel having an upper portion forming a contact chamber and a lower portion of substantially greater flow area forming a disengaging chamber, said upper portion extending centrally downward into said lower portion; means for introducing said gas and said solids into the upper region of said contact chamber; means for discharging disengaged gas from said disengaging chamber at a level above the lower end of said contact chamber; a narrow conduit for discharging said solids centrally from the bottom of said disengaging chamber, the vertical distance between the upper end of said conduit and the lower end of said contact chamber, and the relative flow areas of said conduit and said disengaging chamber, being such as to cause a hindered flow of solids in the peripheral region of the portion of said gravitating compact mass expanding outwardly below the lower end of said contact chamber; and a funnel member disposed concentrically within said disengaging chamber with its upper perimeter located within said region of hindered solids flow and below the exposed surface of the outwardly expanding portion of said compact mass, and its lower end extending centrally within said conduit, thereby forming separate central and peripheral confined streams of solids descending through said disengaging chamber, said funnel member having its upper and lower perimeters spaced, respectively, from the walls of said disengaging chamber and of said conduit so as to provide a ratio of peripheral stream flow area to central stream flow area at the bottom of said funnel member at least as great as the corresponding ratio at the top of said funnel member.

REUBEN T. SAVAGE.
JACK C. DART.

References Cited in the file of this patent

UNITED STATES PATENTS

| Number | Name | Date |
|---|---|---|
| 2,393,893 | Evans et al. | Jan. 29, 1946 |
| 2,400,194 | Day et al. | May 14, 1946 |
| 2,416,230 | Simpson | Feb. 18, 1947 |
| 2,429,545 | Bergstrom | Oct. 21, 1947 |
| 2,486,200 | O'Connor | Oct. 25, 1949 |
| 2,487,961 | Angell | Nov. 15, 1949 |
| 2,493,672 | Johnson | Jan. 3, 1950 |